US008151115B2

(12) United States Patent  (10) Patent No.: US 8,151,115 B2
Depta  (45) Date of Patent: Apr. 3, 2012

(54) COMPUTER INCLUDING AT LEAST ONE CONNECTOR FOR A REPLACEABLE STORAGE MEDIUM, AND METHOD FOR STARTING AND OPERATING A COMPUTER VIA A REPLACEABLE STORAGE MEDIUM

(75) Inventor: Robert Depta, Augsburg (DE)

(73) Assignee: Fujitsu Technology Solutions Intellectual Property GmbH, Munich (DE)

( * ) Notice: Subject to any disclaimer, the term of this patent is extended or adjusted under 35 U.S.C. 154(b) by 935 days.

(21) Appl. No.: 11/518,318

(22) Filed: Sep. 11, 2006

(65) Prior Publication Data

US 2007/0061880 A1   Mar. 15, 2007

(30) Foreign Application Priority Data

Sep. 9, 2005  (DE) .................. 10 2005 043 043

(51) Int. Cl.
 *G06F 21/00* (2006.01)
(52) U.S. Cl. ................. 713/185; 726/5; 726/17; 726/27
(58) Field of Classification Search .................. 726/2–22
 See application file for complete search history.

(56) References Cited

U.S. PATENT DOCUMENTS

| 3,996,449 | A |   | 12/1976 | Attanasio et al. | |
| 4,462,076 | A |   | 7/1984 | Smith, III | |
| 4,672,572 | A | * | 6/1987 | Alsberg .......................... | 726/11 |
| 4,799,635 | A |   | 1/1989 | Nakagawa | |
| 5,448,045 | A | * | 9/1995 | Clark ............................ | 235/382 |
| 5,469,573 | A | * | 11/1995 | McGill et al. .................. | 717/127 |
| 5,550,999 | A |   | 8/1996 | Nagano et al. | |
| 5,557,739 | A | * | 9/1996 | Gupta et al. .................... | 714/34 |
| 5,622,064 | A | * | 4/1997 | Gluskoter et al. ................ | 70/14 |
| 5,859,968 | A | * | 1/1999 | Brown et al. .................... | 726/36 |
| 6,032,257 | A |   | 2/2000 | Olarig et al. | |
| 6,044,470 | A | * | 3/2000 | Kuriyama ........................ | 726/19 |
| 6,389,542 | B1 | * | 5/2002 | Flyntz ............................ | 726/17 |

(Continued)

FOREIGN PATENT DOCUMENTS

DE         10248465 A1    5/2003

OTHER PUBLICATIONS

Schneier, "Applied Cryptography", 1996, Wiley and Sons, 2nd Edition, pp. 35-37 and 180-184.*

(Continued)

*Primary Examiner* — Edan Orgad
*Assistant Examiner* — Brian Olion
(74) *Attorney, Agent, or Firm* — Edell, Shapiro & Finnan, LLC

(57) ABSTRACT

A method starts and operates a computer with an operating system held on a replaceable storage medium. The method includes: checking the authenticity of the replaceable storage medium and/or checking a user's authority for executing the operating system held on the replaceable storage medium. The operating system held on the replaceable storage medium is executed if the replaceable storage medium is authentic and/or the user is authorized to use the operating system. Checking the authenticity of the replaceable storage medium and the user's use authority ensures the integrity of the operating system. Thereby, modifications to the operating system and to the computer are made more difficult. The invention also relates to a computer and a replaceable storage medium which are suitable for carrying out the method.

28 Claims, 2 Drawing Sheets

U.S. PATENT DOCUMENTS

| | | | |
|---|---|---|---|
| 6,684,326 | B1 | 1/2004 | Cromer et al. |
| 6,757,824 | B1 * | 6/2004 | England ................ 713/156 |
| 6,871,278 | B1 * | 3/2005 | Sciupac ................ 713/185 |
| 7,062,045 | B2 * | 6/2006 | Riddick et al. ............ 380/44 |
| 2002/0007425 | A1 | 1/2002 | Kaysen |
| 2002/0128068 | A1 * | 9/2002 | Randall Whitten et al. .... 463/43 |
| 2002/0138769 | A1 * | 9/2002 | Fishman et al. .......... 713/202 |
| 2002/0144104 | A1 | 10/2002 | Springfield et al. |
| 2003/0084307 | A1 * | 5/2003 | Schwartz ............... 713/189 |
| 2003/0200458 | A1 * | 10/2003 | Hori et al. ............. 713/200 |
| 2005/0033992 | A1 * | 2/2005 | Inabe .................. 713/202 |
| 2005/0039032 | A1 * | 2/2005 | Babowicz et al. ......... 713/193 |

OTHER PUBLICATIONS

Schmidt, Jurgen, and Vahldieck, Axel, "Hols vom Stockchen," c't, No. 2003/13, Jun. 16, 2003, XP002453498, pp. 208-210.
European Search Report in counterpart European application, dated Oct. 24, 2007, with English translation of relevant portion.

* cited by examiner

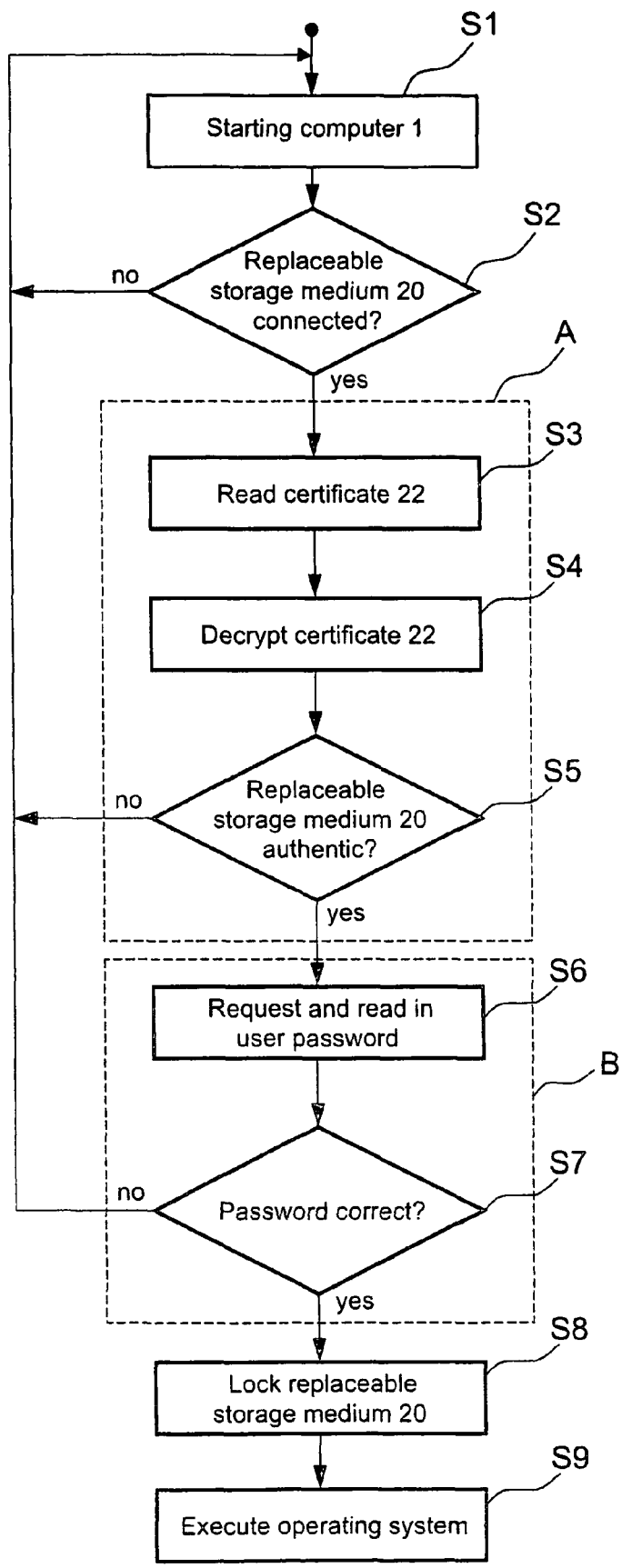

COMPUTER INCLUDING AT LEAST ONE CONNECTOR FOR A REPLACEABLE STORAGE MEDIUM, AND METHOD FOR STARTING AND OPERATING A COMPUTER VIA A REPLACEABLE STORAGE MEDIUM

CROSS REFERENCE TO RELATED APPLICATIONS

This application claims priority under 35 U.S.C. §§119 and/or 365 to Application No. DE 102005043043.0 filed on Sep. 9, 2005, entitled "Computer Having at Least One Connection Means for a Replacement Storage Medium and Method for Starting and Operating a Computer with a Replaceable Storage Medium," the entire contents of which are hereby incorporated by reference.

FIELD OF THE INVENTION

The invention relates to a computer, including at least one connector for a replaceable storage medium, configured to execute an operating system stored on a connected replaceable storage medium. The invention relates to a method for starting and operating a computer via a replaceable storage medium and also relates to a suitable replaceable storage medium.

BACKGROUND

When a computer has been turned on, a multistage starting operation, also called booting, is usually executed before application programs can be executed on the computer. For example, the starting operation on an IBM PC-compatible computer is illustrated below. When the computer has been turned on, a program called BIOS (Basic Input Output System), held in a nonvolatile memory, e.g., EPROM (Erasable Programmable Read Only Memory) or solid-state memory, on the computer's motherboard, is first started. First, the BIOS initializes the screen and the keyboard and tests the memory modules in the computer's volatile memory. Then, settings for important peripheral devices are read from a further nonvolatile memory (usually a battery-buffered CMOS chip). For the rest of the boot operation, the stored information is read concerning connected hard disk drives and other mass memories, such as optical drives. A first data sector, called Master Boot Record (MBR), is then read in from one of the connected drives. The MBR contains information relating to the course of the rest of the starting operation and defines the independent subsections (partitions) of the hard disk drives. In addition, the MBR contains a program, called First Stage Boot Loader, whose task is to search for what are known as boot sectors on the specified partitions of the hard disk drives. A boot sector which has been found contains a further program, called Second Stage Boot Loader, which in the simplest case directly starts an operating system held on this partition. In other cases, for example, the Second Stage Boot Loader provides the user with the opportunity to select between different operating systems held on different partitions. In addition, the Second Stage Boot Loader can be designed to start an operating system which is not held on one of the hard disk drives or on a further mass memory drive but rather is loaded via a network connection, for example, or is held on a plug-on replaceable storage medium, e.g., a USB (Universal Serial Bus) memory or a solid-state memory card.

The known boot process outlined makes it possible to intervene in the boot operation at several points:
  BIOS setting for stipulating the Master Boot Record,
  contents of the Master Boot Record (First Stage Boot Loader),
  contents of the boot sectors of the starting partition (Second Stage Boot Loader).

These intervention options for the user allow the boot operation to be matched to the user's own needs. However, these intervention options create security problems as a result of it being possible to manipulate settings or the Boot Loader programs. For example, appropriate BIOS settings can load an extraneous operating system from a CD or some other optical storage medium, and can read data, in unauthorized fashion, from this operating system. These BIOS settings are protected against access via password protection, by the operating system, which is actually provided for the computer. For this very reason, the BIOS typically provides the option of permitting booting only from particular mass memories and/or protecting these settings via a password which is stored in the CMOS memory of the BIOS. The protective properties of a method of this kind or similar can usually be bypassed using very simple methods. By way of example, simple manipulation by interrupting the power supply to the CMOS memory on the computer's motherboard by briefly removing the supply battery for the CMOS memory is sufficient to remove the password protection in the BIOS.

It is also usual practice, in the known boot processes, to install an operating system from an installation medium (CD, DVD) provided by the manufacturer in a local version, matched to the configuration of the computer, on a hard disk drive in the computer. This practice also permits a large number of manipulation opportunities, and in this case, not while the operating system is starting, but during its operating phase. For example, many important files used by the operating system, known as "system files", are available on the hard disk drive, frequently unprotected against access. Application programs which are installed can overwrite these files with their own versions of these system files, matched to their requirements, which means that sometimes correct operation of the system or further applications are no longer guaranteed.

A further drawback of known boot processes in which an operating system is transferred by installation to a nonreplaceable mass storage medium on the computer is that the user's preferred settings and configurations for the operating system must be individually set for each computer the user would like to use.

An exception in this case is installations within a defined network, where the settings can be held centrally on a server and can be loaded from this central server onto the local computer whenever the computer is started. If such a situation is not present, e.g., in the case of computers or mobile computer which are not part of the network, a user is initially confronted by an unfamiliar working environment on every computer used. Sometimes, for example in the case of partially sighted users, an incorrectly set working environment can not only make the use of the respective computer more difficult but can also make it impossible.

SUMMARY

The invention specifies a computer, configured to execute an operating system stored on a connected replaceable storage medium, and a method in which the starting operation, including loading and operation of an operating system, is effected with as much protection as possible and in which the integrity of the operating system is protected. In addition, the invention specifies a replaceable storage medium which is suitable in conjunction with the computer for carrying out the method.

The inventive method for starting and operating a computer with an operating system held on a replaceable storage medium comprises:

checking the authenticity of the replaceable storage medium and/or checking a user's use authority for executing the operating system held on the replaceable storage medium, and executing the operating system held on the replaceable storage medium if the replaceable storage medium is authentic and/or the user is authorized to use the operating system.

Checking the authenticity of the replaceable storage medium ensures the integrity of the operating system. Modifications to the operating system, which can result in unstable operating states, are ruled out. By checking the user's use authority it is possible both to check licenses and to rule out extraneous use. In one advantageous embodiment of the invention, the authenticity of the connected replaceable storage medium is checked using a certificate. In another advantageous embodiment, the user's use authority is checked using a password.

The inventive computer with at least one connector for a replaceable storage medium is configured to execute an operating system which is on a connected replaceable storage medium, and has a boot control apparatus. The boot control apparatus is suitable for carrying out the method outlined above.

In one advantageous embodiment, the boot control apparatus is either produced as an independent hardware unit within the computer or is implemented using a program, the program being stored in an unalterable memory. A boot control apparatus of this kind further restricts manipulation opportunities for bypassing the authentication and/or authorization step during the computer's starting operation and hence also on the operating system used.

In another advantageous embodiment, the connector within the computer is connected to the boot control apparatus, so that all data interchanged between the connected replaceable storage medium and the computer are routed via the boot control apparatus. This likewise makes it more difficult to bypass the authentication and/or authorization step during the computer's starting operation.

In another advantageous embodiment, the computer is set up such that an operating system can be executed only from one of the connected replaceable storage media. This also encumbers manipulations on the computer or on the data held on a mass storage medium in the computer.

The inventive replaceable storage medium is suitable for use with the inventive computer and has at least two memory areas and a memory control unit, the memory control unit being set up such that the computer can effect only read access to one of the two memory areas in a first operating mode and can effect read and write access in a second operating mode, and can effect read and write access to the other memory area in both operating modes.

Providing two different memory areas and different operating modes implements differentiated access protection for the contents held on the replaceable storage medium. This allows an operating system held on the replaceable storage medium to be protected against alterations during normal operation in a first operating mode, but allows other data to be stored on the replaceable storage medium. Nevertheless, in the second operating mode it is possible to alter the operating system in particular situations, e.g., for an update.

In one advantageous embodiment of the replaceable storage medium, the memory control unit is set up such that it permits operation of the replaceable storage medium in the first and/or second operating mode only if access protection data transmitted by the computer beforehand has been received, checked and found to be valid.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

The invention is explained in more detail below with reference to exemplary embodiments, where:

FIG. 3 shows flow diagram of a method for starting a computer.

DETAILED DESCRIPTION

Figure 1:
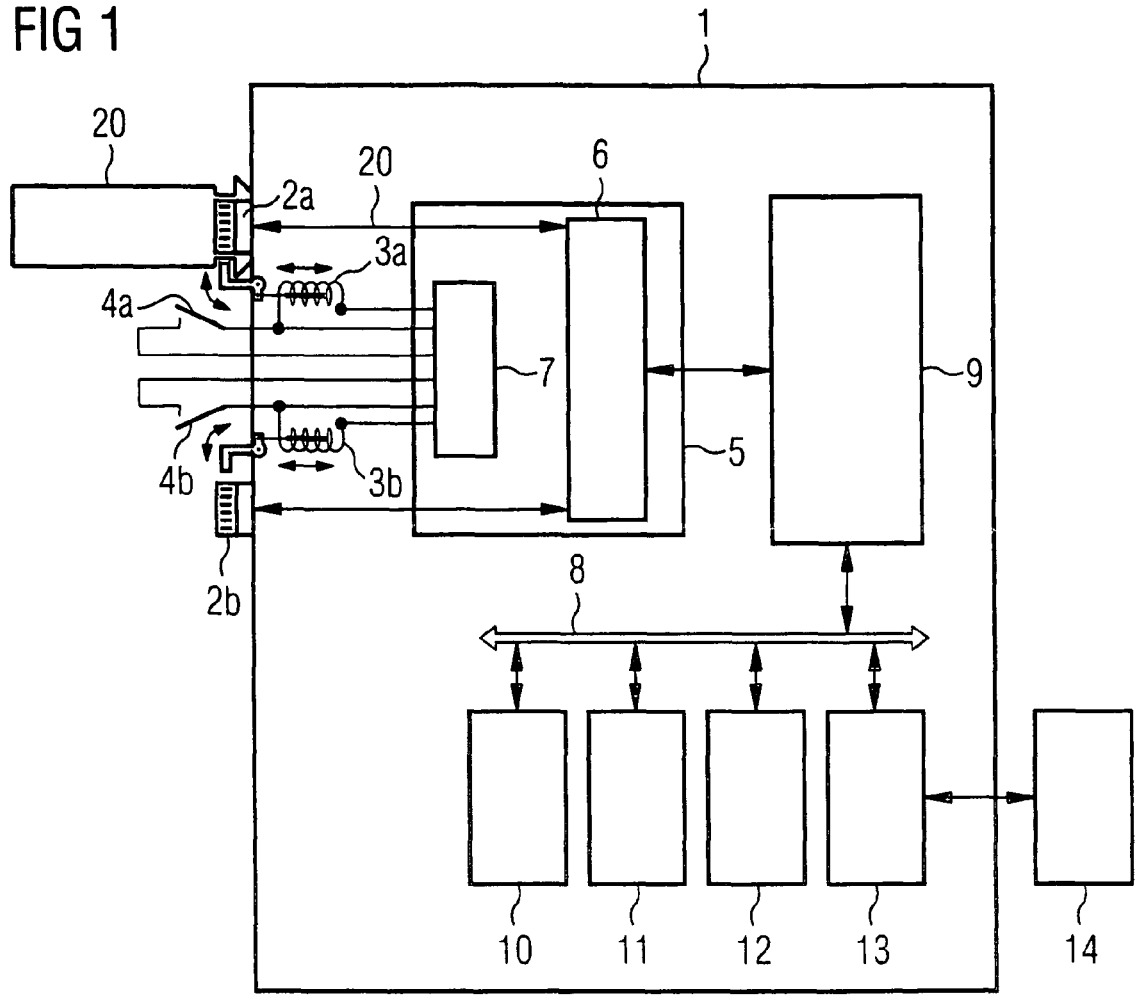
FIG. 1 shows a schematic illustration of an exemplary embodiment of the inventive computer.

FIG. 1 schematically shows, in the form of a block diagram, a computer 1 with first and second connectors 2a, 2b for replaceable (removable) storage media, the first connector 2a having had a replaceable storage medium 20 connected to it. For each of the two first and second connectors 2a, 2b there is a locking apparatus 3a, 3b and a selector switch 4a, 4b. The connectors 2a and 2b, locking apparatuses 3a and 3b and selector switches 4a and 4b are connected to a boot control apparatus 5. The boot control apparatus 5 has an encryption and decryption unit 6 and also a locking controller 7. The boot control apparatus 5 is connected to further components of the computer via a bus system 8. These are a BIOS (Basic Input Output System) 9, a processor 10, a main memory 11, a mass storage medium 12 and interfaces 13, to which peripheral devices 14 outside the computer 1 can be connected.

For reasons of clarity, the schematic design of an exemplary embodiment of the inventive computer 1 as shown in FIG. 1 is limited to such components as are fundamental within the context of the invention. Components such as power supply, optical drives, etc. which are important to its operation but which are known from the prior art and are not relevant within the context of the invention have not been shown. It also goes without saying that the computer 1 shown in the schematic illustration has a very simplified architecture. For example, just one bus system 8 is shown which connects the various components in the computer 1. However, the features of the computer 1 shown which are fundamental to the invention can also be transferred to more complex known and customary computer architectures. This applies in similar fashion to the interfaces 13 (not distinguished in more detail) for connecting external peripheral devices 14. These are to be understood as known and customary interfaces and peripheral devices, such as a PS/2 interface for keyboards and mouse pointers, a video interface for connecting one or more monitors, USB or other serial or parallel data transmission interfaces for connecting external mass memory devices or printers and also known network connections.

In addition to the known interfaces 13, the computer 1 has, according to the invention, the first connector 2a and second connector 2b for replaceable storage media 20. The fact that just two connectors 2 are shown is merely exemplary. Any desired number is conceivable in this context, the connection to the boot control apparatus being able to be in the form of a point-to-point connection, as shown, or else via a bus. In regards to their electrical connection properties and their data transmission properties, the connectors 2 may be entirely based on known specifications and protocols, for example, the Universal Serial Bus (USB) interface standard, in this case particularly USB 2.0 for reasons of speed specification, the Serial Attached Small computer system interface (SAS), or Serial Advanced Technology Attachment (SATA) specification. Besides the specifications and protocols mentioned, in principle, any high-speed data transmission interface is suitable.

The connectors 2 differ from interfaces 13 particularly in that data interchange with the connected replaceable storage media 20 is possible only via the boot control apparatus 5. In order to make manipulation more difficult, the boot control apparatus 5 is produced as an independent unit. Preferably, the boot control apparatus 5 is a separate hardware unit. Alternatively, it is also possible for the boot control apparatus 5 to be located on the motherboard of the computer 1, but is separate in the sense that, by way of example, memories used within the boot control apparatus 5 are not accessible to other components in the computer 1. It is also conceivable to produce the boot control apparatus 5 in software-implemented form, such that it is stored in a memory area which cannot be overwritten. Likewise, the boot control apparatus 5 may be part of the BIOS 9, if suitable measures ensure that the part of the BIOS 9 which contains the boot control apparatus 5 cannot be overwritten by the user during updates, i.e., "BIOS flash". The software implementation of the boot control apparatus 5 is an alternative to hardware implementation suitable to the consumer sector with lower security demands.

The way in which the boot control apparatus 5, comprising the encryption and decryption unit 6 and the locking controller 7, works is described in more detail below.

In addition, the connectors 2 are distinguished from known interfaces by the presence of the locking apparatuses 3 and of the selector switches 4. The locking apparatuses 3a and 3b allow a replacement storage medium 20, connected to the respective first connector 2a or second connector 2b, to be mechanically fixed to the connectors 2, and hence to the computer 1, thereby preventing the replacement storage medium 20 from being removed, whereby locking and release of the replaceable storage medium 20 can be controlled via the locking controller 7 in the boot control apparatus 5. Mechanically, this can be achieved, by way of example, by virtue of an electromagnetically operated hook engaging into an appropriate cutout in the casing of the replaceable storage medium 20, as indicated in the schematic drawing. Besides electromagnetic or electromechanical operation, piezoelectric operation is also conceivable for the locking apparatus 3.

In this case, the locking apparatus 3 should be designed such that the replaceable storage medium 20 is locked passively, for example via spring forces; in contrast, the replaceable storage medium 20 needs to be released actively via appropriate signals from the boot control apparatus. This has the advantage that the locking of the replaceable storage medium 20 cannot be initiated via interrupting the power supply for the computer 1. In one alternative embodiment, provision may be made for replaceable storage media 20 to be inserted by countersinking them in a depression in the casing of the computer 1, so that they cannot be removed for purely mechanical reasons. The task of the locking apparatus is then not to restrain the replaceable storage media 20 but rather, conversely, to actively eject them, which results in the same functionality for the locking apparatus 3.

In another embodiment, the locking apparatuses 3 may also be designed such that, in addition to locking an already inserted replaceable storage medium 20, it possible to prevent a replaceable storage medium 20 from being coupled to one of the connectors 2.

Figure 2:
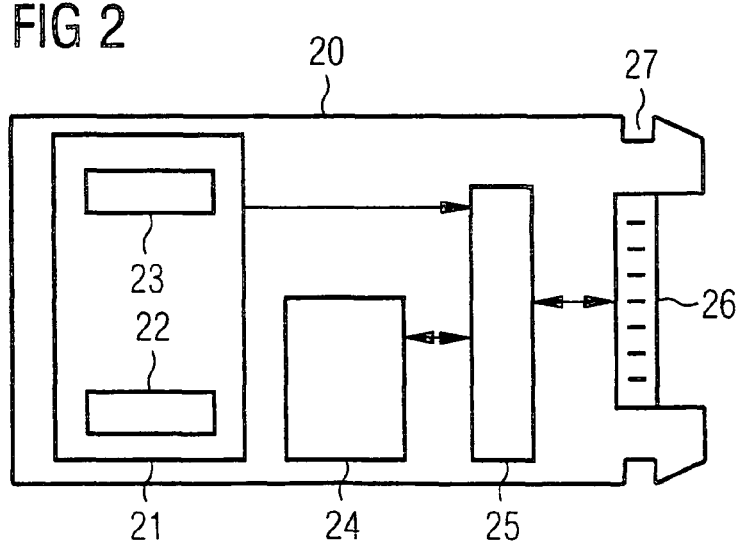
FIG. 2 shows a schematic illustration of an exemplary embodiment of the inventive replaceable storage medium which is suitable for carrying out the inventive method in conjunction with the computer shown in FIG. 1.

FIG. 2 shows an exemplary embodiment of the replaceable storage medium 20, which is suitable for connection to the first and second connectors 2a, 2b in the computer 1, in more detail.

The replaceable storage medium 20 has a read memory area 21 which comprises an operating system 23 and a certificate 22. This read memory area 21 is set up such that it is possible to effect only read access to it in a first operating mode and it is possible to effect read and write access to it in a second operating mode. A read/write memory area 24 is provided, to which read and write access can be effected in both operating modes. A memory control unit 25 is connected to both memory areas 21 and 24, and also computer connections 26. The casing of the replaceable storage medium 20 has locking notches 27 which can interact with the locking apparatus 3.

The first operating mode is the normal operating mode, in which the computer 1 is started and operated by an operating system 23 provided on the replaceable storage medium 20. The second operating mode is for exceptional cases such as writing back a backup copy of the operating system 23 or an update for the operating system 23. Since the read memory area 21 can have only read access effected to it in the first operating mode, in which the replaceable storage medium 20 is normally operated, it is labeled a read memory 21 for the purpose of simplification, and by contrast the read/write memory area 24 is labeled a read/write memory 24.

FIG. 3 shows a flow diagram of a method for starting operation for a computer in accordance with the present invention. This method could, for example, be performed by the computer 1 as described in connection with FIG. 1. In view of that reference numerals as introduced in connection with FIGS. 1 and 2 are used in the following.

When the computer 1 has been started or when the computer 1 has been restarted after a change of user and/or operating system in a first step S1, the boot control apparatus 5 checks, in a second step S2, whether at least one replaceable storage medium 20 is connected to one of the first and second connectors 2a, 2b. The method continues only if at least one replaceable storage medium 20 is present.

If more than one replaceable storage media 20 are present, an additional step might be performed to determine which of the replaceable storage media 20 has been selected for the starting operation by the user by means of the appropriate switch 4a or 4b. The selector switches 4a, 4b therefore allow a user to have various replaceable storage media 20, for example with different operating systems 23, permanently plugged onto the computer 1 and to choose the desired operating system 23 selectively for each boot operation. In a simple version of the computer 1, this possibility could be dispensed with and just one first connector 2a could be provided, as a result of which the selector switch 4 could be omitted. By way of example, the text below assumes a configuration as shown in FIG. 1, where just one replaceable storage medium 20 has been connected to the first connector 2a and this replaceable storage medium 20 has also been selected by an appropriate switch position for the selector switch 4a.

One of the fundamental aims of the invention is to protect the computer 1 and data belonging to its user and held on its mass storage medium 12, e.g., a hard disk drive, against unauthorized access and against destruction by an unsound operating system.

This is achieved essentially by two groups of steps: In a first group A comprising steps S3 to S5, the authentication of the replaceable storage medium 20 from which an operating system 23 is intended to be loaded is proofed. In a second group B comprising steps S6 and S7, the user's authority to be able to use this operating system 23 is checked.

The effectiveness of the two groups of steps presupposes that opportunities for bypassing them are removed. For this reason, the BIOS 9 of the computer 1 is designed such that an operating system can be loaded only from a replaceable storage medium 20 which is connected to the boot control apparatus 5. Any other opportunity to load an operating system must be strictly removed. This applies both to internal mass storage media 12, for example a hard disk drive or an optical drive which may be present, and to external mass memories, for example connected via the interfaces 13.

When a replaceable storage medium 20 has been selected for the starting operation by the user, first of all the authenticity of the replaceable storage medium 20 and hence of the operating system 23 it holds is tested by the BIOS 9 under the control of the boot control apparatus 5 by performing the steps of group A. One way of performing an authenticity check of this kind is provided by certificates, e.g., digital signatures. These are a known code phrase, for example the name of the manufacturer of an operating system, which the manufacturer encrypts with an asymmetrical encryption method using what is known as a private key and stores on the replaceable storage medium 20.

As can be seen in FIG. 2, a certificate 22 of this kind is held together with the operating system 23 in the read memory 21 of the replaceable storage medium 20. For the purpose of authentication, this certificate 22 is read in by the boot control apparatus 5 in step S3 and is decrypted in the encryption and decryption unit 6 of the boot control apparatus 5 using the known public key which is complementary to the manufacturer's private key in step S4. This public key needs to be provided by the manufacturer of an operating system. It can either be stored in the BIOS 9 or can be loaded from the manufacturer or a public key server via a network link at the time of each starting operation. If, in step S5, the agreed code phrase is found in the decrypted certificate 22 following decryption, this indicates that the replaceable storage medium 20 has been created authentically by the specified manufacturer.

From the system of certification or of digital signatures which is described here in a simple form, more complex methods are known which simultaneously allow licenses or serial numbers to be checked and a validity period to be included for the use of the replaceable storage medium 20. Such known methods can be used unrestrictedly within the scope of this invention.

When the replaceable storage medium 20 has authenticated itself to the boot control apparatus 5 and hence to the BIOS 9, the steps of group B are performed to check the user's authority to be able to use this replaceable storage medium 20 and the operating system 23 it contains. It is possible to use a wide variety of authorization options known from the prior art, starting with simple password input which the boot control apparatus, possibly using the BIOS 9, requests from a user using the screen and the keyboard, i.e., step S6, and validates it, i.e., step S7, via checking biometric data for the user. Checking the user biometric data can be done using special peripheral devices 14, such as a fingerprint sensor. This check on the access data is performed within the boot control apparatus 5.

Only if both groups of steps A and B, i.e., authentication check and authorization check, have a positive outcome is the operating system 23 executed on the computer 1 in a step S9. Before doing so, the replaceable storage medium 20 might be locked in a step S8 to prevent it from being removed which would lead to a disruption of the starting procedure of the operating system 23. Details on the locking of the replaceable storage medium 20 are described below.

To ensure that the operating system 23 also retains its integrity during operation, all data from the operating system 23 is stored on the replaceable storage medium 20 in encrypted form. Required files from the operating system 23 are decrypted by the encryption and decryption unit 6 in the boot control apparatus 5. For the purpose of encrypting the operating system 23, any known symmetrical or asymmetrical encryption methods can be used, with preference being given to symmetrical key methods, in this case for performance reasons. The key used for decryption could be requested from the user. Alternatively, so as not to burden the user with too many requests during the starting operation for the computer 1, the key could also be coupled to the user's authorization password or could be requested from a database belonging to the manufacturer via a network link using the authentication data from the replaceable storage medium 20.

In addition, the operating system 23 is protected against manipulation by virtue of it being held in the read memory 21 of the replaceable storage medium 20. This read memory 21 is not a ROM (Read Only Memory) in the actual sense. Depending on the operating mode, the block on writing is ensured by the memory control unit 25, although both memory areas 21 and 24 are rewritable memories from their physical properties.

A configuration of this kind has the advantage that under certain circumstances, for example for loading updates for the operating system 23 or for storing back backup copies of the operating system 23, data can be fed into the read memory area 21 in a second operating mode, said memory area being designed as a read only memory in the first operating mode.

For this purpose, the memory control unit 25 provides access protection for the second operating mode, so that write access to the read memory area 21 is possible only after the transmission of correct access data, which are unknown to the user and are held in concealed or encrypted form in the backup copies or in an update of the operating system 23.

Furthermore, the memory control unit 25 can also have access protection for the "normal", first operating mode, said access protection also allowing read access to the read memory area 21 and read and write access to the read/write memory area 24 only after correct access data has been transmitted. The password used by the user for authorization or else, for example, license data could be used here as access data. This provides further protection against unauthorized access for the operating system 23 and for other data on the replaceable storage medium 20.

As a departure from the exemplary embodiments shown in the figures, an encryption and decryption unit may also be provided in the replaceable storage medium 20 instead of the encryption and decryption unit 6 or in addition to this in the boot control apparatus 5. For the purpose of using an encryption and decryption unit contained in the replaceable storage medium 20, the respectively required key is then made available to the replaceable storage medium 20 by the boot control apparatus 5.

In one embodiment, the operating system 23 is executed directly from the replaceable storage medium 20 without parts of the operating system 23 being copied to the main memory 11 beforehand. However, every access operation to the operating system 23 results in simultaneous decryption by the encryption and decryption unit 6. For performance reasons, in particular for certain components of the operating system 23 that are frequently required, it is therefore likewise conceivable for those certain components to be decrypted only once and to be held in their decrypted version in the main memory 11. This requires a trade off between performance and security aspects, since components of the operating system 23 which are stored in the main memory 11 are no longer protected against manipulation at least temporarily until the computer 1 is restarted.

Operating systems usually have a multiplicity of configuration files, first for alignment with various hardware circumstances in a computer and second for incorporating user-matched settings. In line with the invention, such alignment and configuration files are incorporated by providing the read/write memory 24 on the replaceable storage medium 20. In order to protect the user-specific adjustments, which sometimes may also contain passwords for the use of programs or other sensitive data, the data is encrypted by the encryption and decryption unit 6 before it is stored in the read/write memory 24. In order to make it possible to work with the operating system 23 from the replaceable storage medium 20 on various computers 1, alignment files for the individual computers 1 are advantageously provided with a number identifying each computer 1, for example the serial number of the processor 10 or an ID number distinctly associated with the BIOS 9.

To prevent a currently active operating system 23 from being removed from the computer 1, inadvertently or without authorization, the associated locking apparatus 3, i.e., the locking apparatus 3a in the example in FIG. 1, is instructed by the locking controller 7 of the boot control apparatus 5 to prevent removal of the replaceable storage medium 20. In order to release this lock, it is necessary for the relevant operating system 23 to be shut down properly, which for safety reasons requires the user to re-enter the password.

In an alternative embodiment, however, it could be possible to remove a replaceable storage medium 20 even before the operating system 23 is shut down and terminated. In this case too, this requires a password to be entered. However in this instance, which is appropriate when the operating system 23 is equipped with a multiple license for multiple parallel use, the data and files from the operating system 23 which are required during operation must be copied to the main memory 11 beforehand.

Other special features of the inventive method may arise when the computer 1 is set up to execute a plurality of operating systems 23 in parallel. This can be achieved firstly by virtue of the computer 1 having a plurality of processors 10 or by virtue of a plurality of virtual processors being simulated by the execution of suitable programs. In such a case, provision is made for a plurality of instances of the operating system 23 to be able to be started from a replaceable storage medium 20, or for different operating systems 23 to be able to be operated in parallel from different replaceable storage media 20 plugged into various connectors 2.

Execution of the inventive method is possible not just using the replaceable storage medium 20. It is likewise conceivable to use a replaceable storage medium which has just one memory area to which read and write access can be effected without departing from the fundamental inventive concept. Replaceable storage media of this kind are, e.g., "USB (memory) sticks". However, some of the additional security measures described cannot be implemented in conjunction with a replaceable storage medium of this kind.

While the invention has been described in detail and with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

LIST OF REFERENCE SIGNS

1: Computer
2a, 2b: replaceable storage medium connectors
3a, 3b: Locking apparatus
4a, 4b: Selector switch
5: Boot control apparatus
6: Encryption/decryption unit
7: Locking controller
8: Bus system
9: BIOS
10: Processor
11: Main memory
12: Mass storage medium
13: Interfaces
14: Peripheral devices
20: Replaceable storage medium
21: Read memory
22: Certificate
23: Operating system
24: Read/write memory
25: Memory control unit
26: Computer Connections
27: Locking notch

What is claimed is:

1. A computer configured to execute an operating system that is stored on a replaceable storage medium configured to store the operating system and an encrypted certificate, the computer comprising:
   at least one replaceable storage medium connector configured to receive the replaceable storage medium; and
   a boot control apparatus comprising an encryption and decryption unit configured to:
      read the encrypted certificate from the replaceable storage medium;
      decrypt the encrypted certificate to obtain a decrypted certificate;
      authenticate the replaceable storage medium by identifying a code phrase in the decrypted certificate;
      after authenticating the replaceable storage medium, checking user supplied information in order to validate a user's authorization to use the operating system; and
      allow execution of the operating system on the computer in response to successfully authenticating the replaceable storage medium and validating the user's authorization.

2. The computer as claimed in claim 1, wherein the boot control apparatus is configured to request the user supplied information comprising a password and/or biometric data from the user and to validate the user's authorization based on the password and/or biometric data.

3. The computer as claimed in claim 1, wherein the boot control apparatus is an independent hardware unit of the computer.

4. The computer as claimed in claim 1, wherein the boot control apparatus is implemented via a program stored in an unalterable memory.

5. The computer as claimed in claim 1, wherein the at least one replaceable storage medium connector is coupled to the boot control apparatus such that all data exchanged between the replaceable storage medium and the computer is routed via the boot control apparatus.

6. The computer as claimed in claim 5, wherein the encryption and decryption unit is configured to encrypt and decrypt all data that is exchanged between the replaceable storage medium and the computer.

7. The computer as claimed in claim 6, wherein the boot control apparatus is configured to request a key from the user and to use the key for the encryption and decryption unit.

8. The computer as claimed in claim 7, wherein the boot control apparatus is configured to check a user's authority via testing the suitability of the key specified by the user for decrypting data stored on the replaceable storage medium.

9. The computer as claimed in claim 1, wherein the computer is configured such that only an operating system stored on the replaceable storage medium is executable by the computer.

10. The computer as claimed in claim 1, wherein the boot control apparatus is configured to prevent copying of the operating system stored on the replaceable storage medium to a mass memory.

11. The computer as claimed in claim 1, wherein the boot control apparatus permits the operating system stored on the replaceable storage medium to be copied to a mass memory only when an access-protected backup file is created as a copy and is transmitted to the mass memory.

12. The computer as claimed in claim 11, wherein the boot control apparatus is configured such the operating system, copied as the access-protected backup file, can be written back only to a checked and authenticated replaceable storage medium.

13. The computer as claimed in claim 1, further comprising:
a mechanical locking apparatus suitable for preventing the removal of the replaceable storage medium.

14. The computer as claimed in claim 13, wherein the mechanical locking apparatus is also suitable for preventing the insertion of a replaceable storage medium.

15. The computer as claimed in claim 13, wherein the mechanical locking apparatus is electromechanically operable.

16. The computer as claimed in claim 15, wherein the mechanical locking apparatus is controlled via the boot control apparatus.

17. The computer as claimed in claim 16, wherein the computer is configured such that the removal of the replaceable storage medium is prevented while an operating system stored on the replaceable storage medium is being executed on the computer.

18. The computer as claimed in claim 1, further comprising:
at least one switch for activating and deactivating the replaceable storage medium.

19. The computer as claimed in claim 1, wherein the at least one replaceable storage medium connector is configured as a serial data transmission port.

20. The computer as claimed in claim 19, wherein the at least one replaceable storage medium connector complies with one of the following specifications: Universal Serial Bus (USB), Serial Attached Small Computer System Interface (SAS), and Serial Advanced Technology Attachment (SATA).

21. The computer as claimed in claim 1, wherein the replaceable storage medium comprises: at least first and second memory areas; and a memory control unit configured to:
permit the computer to effect only read access to the first memory area in a first operating mode;
permit read and write access to the first memory area in a second operating mode in order to update the operating system and/or the encrypted certificate; and
permit the computer to effect read and write access to the second memory area in both the first and second operating modes.

22. A method for starting and operating a computer with an operating system stored on a replaceable storage medium, the method comprising:
reading by a boot control apparatus of the computer, an encrypted certificate stored on the replaceable storage medium;
decrypting the encrypted certificate by an encryption and decryption unit of the boot control apparatus;
authenticating the replaceable storage medium by the boot control apparatus using a code phrase found in the decrypted certificate;
after authenticating the replaceable storage medium, validating by the boot control apparatus, a user's use authority to execute the operating system stored on the replaceable storage medium by checking user supplied information; and
executing on the computer, the operating system stored on the replaceable storage medium in response to successfully authenticating the replaceable storage medium and validating the user's authorization.

23. The method as claimed in claim 22, wherein the user's use authority is validated via a password request and verification.

24. The method as claimed in claim 22, further comprising encrypting and decrypting data that is exchanged between the replaceable storage medium and the computer.

25. The method as claimed in claim 22, further comprising storing user-specific data, produced during operation of the operating system, in a write memory area of the replaceable storage medium.

26. The method as claimed in claim 22, further comprising storing data, specific to the computer and required during operation of the operating system, in a write memory area of the replaceable storage medium.

27. The method as claimed in claim 26, wherein the data is stored with a distinct identifier for the computer.

28. The computer as claimed in claim 5, wherein the boot control apparatus is further configured to store operating system information comprising user preferences and settings on the replaceable storage medium.

* * * * *